United States Patent
Tseng et al.

(10) Patent No.: US 7,118,264 B2
(45) Date of Patent: Oct. 10, 2006

(54) BACKLIGHT MODULE HAVING TWO LIGHTING SIDES

(75) Inventors: Wen-Pao Tseng, Taoyuan Hsien (TW); Hsin-Chien Chiang, Taoyuan Hsien (TW)

(73) Assignee: K-Bridge Electronics Co., LTD, Taoyuan (TW)

( * ) Notice: Subject to any disclaimer, the term of this patent is extended or adjusted under 35 U.S.C. 154(b) by 18 days.

(21) Appl. No.: 10/950,298

(22) Filed: Sep. 27, 2004

(65) Prior Publication Data
US 2006/0072337 A1    Apr. 6, 2006

(51) Int. Cl.
*F21V 7/04*    (2006.01)

(52) U.S. Cl. ............... 362/561; 362/612; 362/614; 362/632; 349/62; 349/65; 349/58

(58) Field of Classification Search ......... 362/601, 362/610, 615, 623, 632, 633, 612, 611, 561, 362/614; 349/61, 62, 64, 65, 58
See application file for complete search history.

(56) References Cited

U.S. PATENT DOCUMENTS

| 6,674,496 | B1 * | 1/2004 | Wei ............................ 349/63 |
| 6,741,301 | B1 * | 5/2004 | Tsuji .......................... 349/58 |
| 6,882,380 | B1 * | 4/2005 | Yu et al. ...................... 349/61 |
| 2003/0063456 | A1 * | 4/2003 | Katahira ..................... 362/27 |
| 2004/0080924 | A1 * | 4/2004 | Chuang ....................... 362/27 |

FOREIGN PATENT DOCUMENTS

KR    2001-35369    *    7/2001

* cited by examiner

*Primary Examiner*—Sandra O'Shea
*Assistant Examiner*—Jacob Y. Choi

(57) ABSTRACT

A backlight module has two lighting sides installed inside a casing. Two sides of the casing are installed with a main display screen and a sub-display screen. The backlight module comprises at least one light source; a light guile plate for guiding light from the light source to the main display screen and the sub-display screen. A lower diffusion sheet, a first light enhancing sheet and preferably, an upper diffusion sheet are installed between the main display screen and the light guide plate. A reflective sheet, a second light enhancing sheet and preferably, an upper diffusion sheet are installed between the sub-display screen and the light guide plate. Part of light from the sub-display screen is reflected to the main display screen.

4 Claims, 2 Drawing Sheets

BACKLIGHT MODULE HAVING TWO LIGHTING SIDES

FIELD OF THE INVENTION

The present invention relates to backlight modules, and particular to a backlight module having two lighting sides, wherein there is no lower diffusion sheet is installed between the light guide plate and the sub-display screen so as to reduce the power lose of the light and reduce the thickness of the backlight module.

BACKGROUND OF THE INVENTION

A liquid crystal display module needs a backlight module to emit light to a liquid crystal display panel because the liquid crystal screen cannot light up itself. The backlight module has two types, a straight type and a lateral type which is especially necessary to a device needing two displays (such as that in a mobile phone) so as to reduce the thickness itself.

With reference to FIG. 1, a prior art backlight module having two lighting sides has a light source 90 and a light guide plate 91. The light guide plate 91 is adjacent to the light source 90 for guiding light of the light source 90 to a main display screen 92 and a sub-display screen 93 at the front and rear sides of the light guide plate 91.

A lower diffusion sheet 94, a light enhancing sheet 95 and an upper diffusion sheet 96, etc. are installed between the light guide plate 91 and the main display screen 92. The function of the lower diffusion sheet 94 is to diffuse the light to adjust the uniformity of the light to avoid reflection light spots on the main display screen 92. The light enhancing sheet 95 is used to correct the light path so as to focus the light to has a preferred directivity. Thereby, the light in the front side of the main display screen 92 is enhanced. The upper diffusion sheet 96 is not a necessary structure. The function of the upper diffusion sheet 96 is to avoid Newton rings to appear and to protect the light enhancing sheet 95. The upper diffusion sheet 96 can be replaced by a reflected light polarizing sheet so that the main display screen 92 has a preferred display effect. A reflective sheet 97, a lower diffusion sheet 94 and a light enhancing sheet 95 are sequentially installed between the light guide plate 91 and the sub-display screen 93. The reflective sheet 97 is installed between the light guide plate 91 and the sub-display screen 93 so as to reflect part of the light from the light source 90 into the main display screen 92. Since in general, the main display screen 92 is larger than the sub-display screen 93, the reflective sheet 97 is used to adjust the light of the main display screen 93 and sub-display screen 93.

However, in this prior art, part of the light is reflected by the reflective sheet 97 to the main display screen 92 so that the light to the sub-display screen 93 is insufficient. If the light source 90 is increased to increase the light to the main display screen 92 and sub-display screen 93, the cost will increase and power loss is also increased.

SUMMARY OF THE INVENTION

Accordingly, the primary object of the present invention is to provide a backlight module having two lighting sides, wherein there is no lower diffusion sheet is installed between the light guide plate 14 and the sub-display screen 12 so as to reduce the transaction lose of the light and reduce the thickness of the backlight module.

To achieve above objects, the present invention provides a backlight module which has two lighting sides installed inside a casing. Two sides of the casing are installed with a main display screen and a sub-display screen. The backlight module comprises at least one light source and a light guide plate for guiding light from the light source to the main display screen and the sub-display screen. A lower diffusion sheet, a first light enhancing sheet and preferably, an upper diffusion sheet are installed between the main display screen and the light guide plate. A reflective sheet, a second light enhancing sheet and preferably, an upper diffusion sheet are installed between the sub-display screen and the light guide plate. Part of light from the sub-display screen 12 is reflected to the main display screen.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
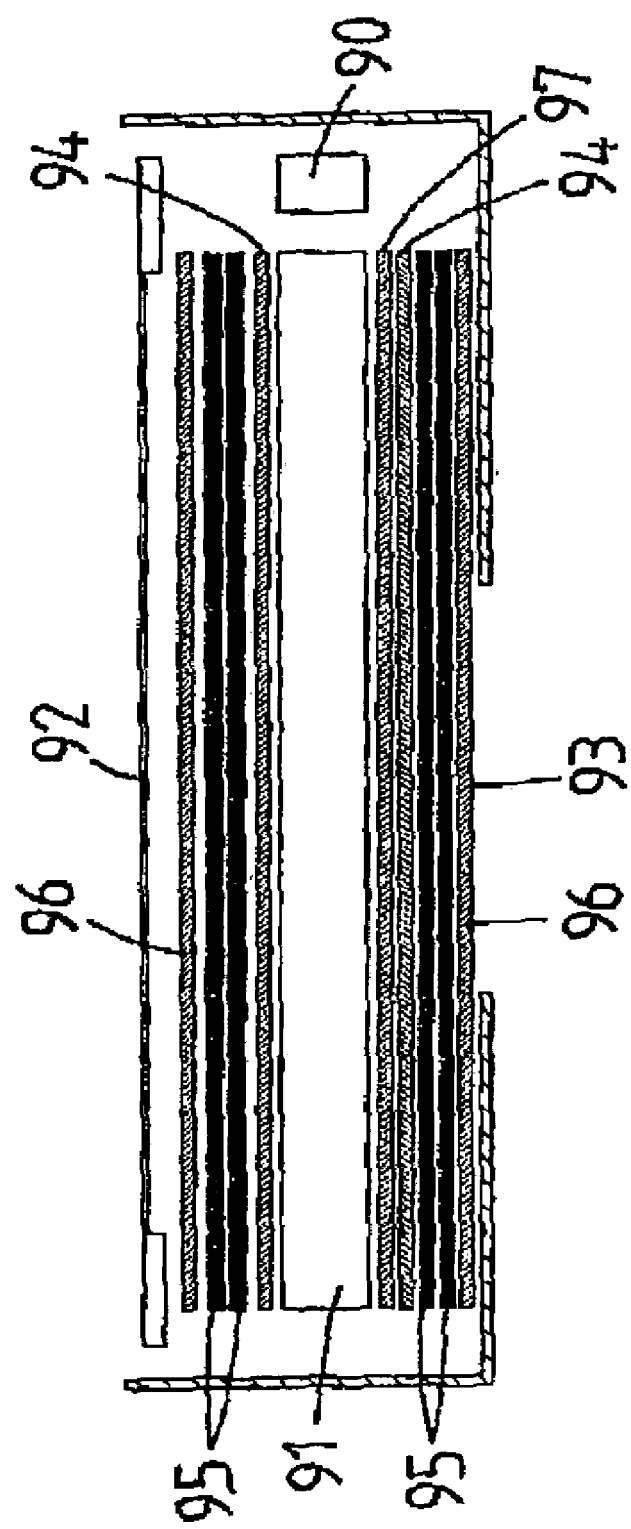
FIG. 1 is a structural cross section view of a prior art backlight module having two lighting sides.
Figure 2:
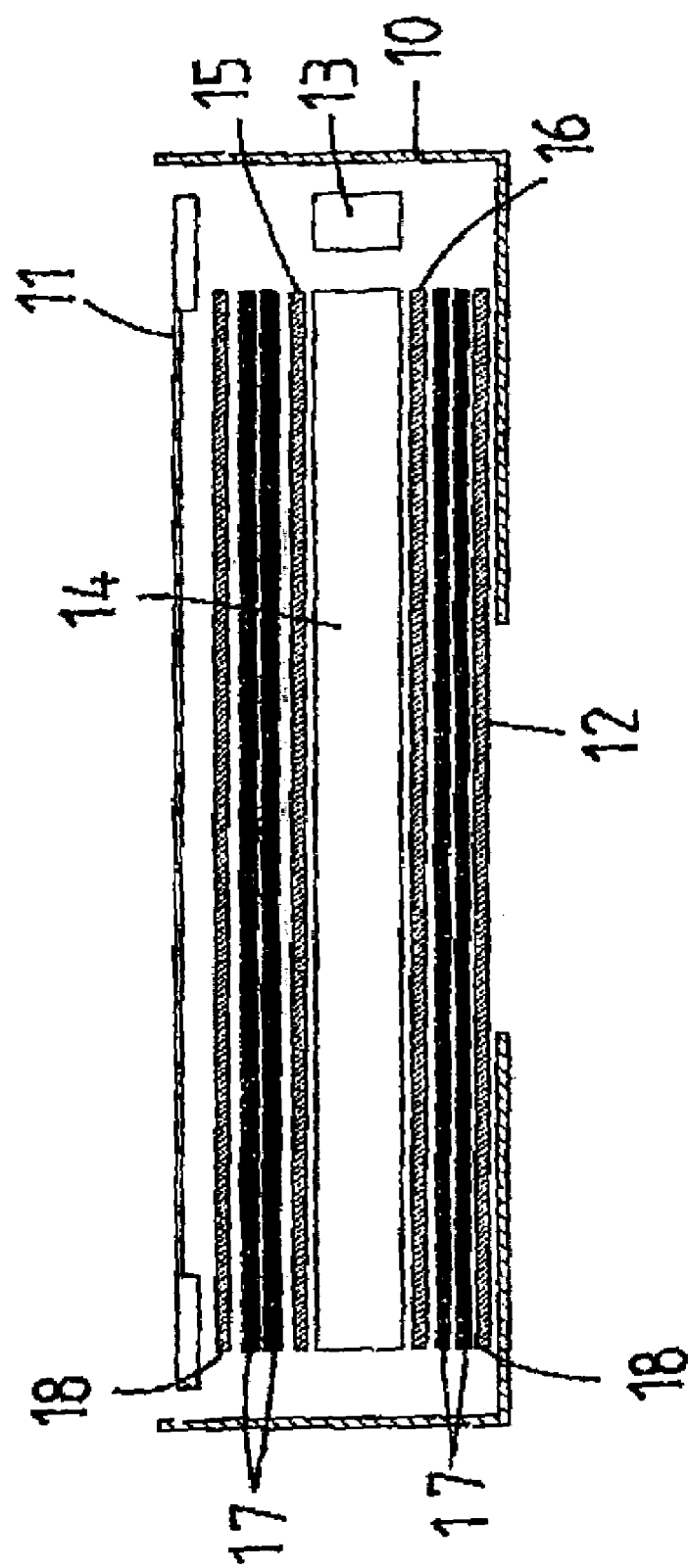
FIG. 2 is a structural cross section view of the present invention.

With reference to FIG. 2, the backlight module having two lighting sides of the present invention is illustrated. The backlight module mainly has a casing 10 (made of metal or plastics). Two sides of the casing 10 have a front liquid crystal display module and a rear liquid crystal display module. The front liquid crystal display module is used as a main display screen 11 and the rear liquid crystal display module is used as a sub-display screen 12. The backlight module has one light guide plate 14 and at least one lateral light source 13 (which is selected from one of cool cathode fluorescent light sources (CCFLs), light emitting diodes (LEDs), luminescence light displays (ELD), etc., (LEDs are preferable). One side of the light guide plate 14 is adjacent to the light source 13 for guiding light of the light source 13 to the main display screen 11 and sub-display screen 12 at the front end rear sides of the light guide plate 14. A lower diffusion sheet 15, a light enhancing sheet 17 and an upper diffusion sheet 18 are installed between the light guide plate 14 and the main display screen 11. When light from the light source 13 enters into the light guide plate 14 to be guided to the main display screen 11, the light will pass through the lower diffusion sheet 15 in advance. The function of the lower diffusion sheet 15 is to diffuse the light to adjust the uniformity of the light to avoid that reflect light spots are appear on the main display screen 11. When the light radiates out of the lower diffusion sheet 15, the light enters into the light enhancing sheet 17 which is used to correct the light path so as to focus the light to have a preferred directivity. Thereby, the light in the front side of the main display screen 11 is enhanced. The upper diffusion sheet 18 is not a necessary structure. The function of the upper diffusion sheet 18 is to avoid Newton rings to appear and to protect the light enhancing sheet 17. The upper diffusion sheet 18 can be replaced by a reflected light polarizing sheet so that the main display screen 11 has a preferred display effect. A reflective sheet 16, a light enhancing sheet 17 and an tipper diffusion sheet 18 are sequentially installed between the right guide plate 14 and the sub-display screen 12. Since in general backlight module having two lighting sides, the sub-display screen 12 is often smaller than the main display screen 11, the reflective sheet 16 is installed between the light guide plate 14 and the sub-display screen 12 so as to reflect part of the light from the tight source 13 into the main display screen 11. After light radiates into the reflective sheet 16, the light not reflected passes through the reflective sheet 16 to directly enter into the light enhancing sheet 17. By the light focusing of the light enhancing sheet 17, the main display screen 11 has a high illumination. The upper diffusion sheet 18 near the sub-display screen 12 can be added as desired. The function of the upper diffusion sheet 18 is to avoid Newton rings to appear and to protect the light enhancing sheet 17 near the sub-display screen 12. The upper diffusion sheet 18 can be replaced by a reflected light polarizing sheet so that the sub-display screen 12 has a preferred display effect.

Therefore, there is no lower diffusion sheet is installed between the light guide plate 14 and the sub-display screen 12 so as to reduce the transaction lose of the light and reduce the thickness of the backlight module.

Thus, the backlight nodule having two lighting sides of the present invention has the effect of incasing illumination, reducing thickness and decreasing cost.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A backlight module having two lighting sides installed inside a casing: two sides of the casing being installed with a main display screen and a sub-display screen, respectively; the backlight module comprising:
    at least one light source;
    a light guide plate for guiding light from the light source to the main display screen and the sub-display screen;
    a lower diffusion sheet and a first light enhancing sheet being installed between the main display screen and the light guide plate;
    a reflective sheet and a second light enhancing sheet being sequentially installed between the sub-display screen and the light guide plate;
    wherein part of light from the sub-display screen is reflected to the main display screen;
    wherein a first upper diffusion sheet is installed between the main display screen and the light enhancing sheet for adjusting the uniformity and illumination of light;
    wherein a second upper diffusion sheet is installed between the sub-display screen and the light enhancing sheet for adjusting the uniformity and illumination of light; and
    wherein the main display screen, the first upper diffusion sheet, the first light enhancing sheet, the lower diffusion sheet, the light guide plate, the reflective sheet, the second light enhancing sheet, the second upper diffusion sheet and the sub-display screen are sequentially arranged one by one, no other plate is installed between any two of the above mentioned sheets.

2. The backlight module having two lighting sides as claimed in claim 1, wherein the casing is made of plastics.

3. The backlight module having two lighting sides as claimed in claim 1, wherein the casing is made of metal.

4. The backlight module having two lighting sides as claimed in claim 1, wherein the light source is selected from one of cool cathode fluorescent light sources, light emitting diodes, and luminescence light displays.

* * * * *